United States Patent [19]

Cottman

[11] 4,209,648
[45] Jun. 24, 1980

[54] ALKYLATED HYDROQUINONE ANTIOXIDANTS

[75] Inventor: Kirkwood S. Cottman, Akron, Ohio

[73] Assignee: The Goodyear Tire & Rubber Company, Akron, Ohio

[21] Appl. No.: 413,478

[22] Filed: Nov. 7, 1973

[51] Int. Cl.$^2$ .................. C07C 37/14; C07C 39/08
[52] U.S. Cl. .................................................... 568/766
[58] Field of Search ............... 260/45.95 E, 625, 404, 260/624 R, 624 C; 568/766

[56] References Cited

U.S. PATENT DOCUMENTS

| 2,008,032 | 7/1935 | Niederl | 260/624 R |
| 2,008,337 | 7/1935 | Robinson | 260/624 |
| 2,567,848 | 9/1951 | Kooyman | 260/625 |
| 2,875,174 | 2/1959 | Webb | 260/45.95 E |
| 3,424,821 | 1/1969 | Hunter | 260/45.95 E |

FOREIGN PATENT DOCUMENTS 1022719  3/1966  United Kingdom ............. 260/45.95 E Primary Examiner—Werren B. Lone
Attorney, Agent, or Firm—J. A. Rozmajzl; J. Y. Clowney

[57] ABSTRACT

Alkylated hydroquinones are prepared by reacting hydroquinone with olefins having 8 and 9 carbon atoms.

5 Claims, No Drawings

ALKYLATED HYDROQUINONE ANTIOXIDANTS

This invention relates to alkylated hydroquinone antioxidants and a process of preparing them. More particularly, it relates to antioxidants prepared by reacting hydroquinone with an olefin containing 8 or 9 carbon atoms and polymers stabilized therewith.

Alkylated hydroquinone is well known in the prior art. For example, 2,5-diamylhydroquinone has been used commercially. The prior art also reveals monooctylated hydroquinone in Czechoslovakian Patent 111,292. It is desirable that improved versions of alkylated hydroquinones be found.

It is an object of the present invention to provide improved alkylated hydroquinone antioxidants. It is also an object of the present invention to provide a process for preparing improved alkylated hydroquinone antioxidants. Another object is to provide polymers stabilized with improved hydroquinone antioxidants. Other objects will become apparent as the description proceeds.

The objects of the present invention are accomplished by reacting hydroquinone with a mono-olefin having 8 to 9 carbon atoms. The molar charge ratio of olefin to hydroquinone is from about 1:1 to 10:1. When the olefin contains 8 carbon atoms, preferably the molar ratio of olefin to hydroquinone is from 1:1 to 5:1 and even more preferably from 1:1 to 3:1. Most preferably it is from 1.5:1 to 3:1. Where the olefin contains 9 carbon atoms, preferably the ratio is from 1:1 to 6:1 and most preferably from 2:1 to 5:1. The resulting products can be used as antioxidants for oxidizable polymers. As will be shown subsequently herein, their antioxidant activity is superior to prior art alkylated hydroquinones.

The reaction conditions used to prepare these compounds are not critical to their activity as antioxidants. One need only react the hydroquinone and the particular olefins using the molar ratios disclosed. For example, the alkylated hydroquinone reaction products can be prepared at temperatures from room temperature to the boiling point of the olefin, a convenient temperature range being from 65° C. to 125° C. The reaction is carried out in the presence of a Friedel-Crafts catalyst. Friedel-Crafts type reactions include many kinds of reactions such alkylations, polymerizations and acylations catalyzed by Lewis acid type acidic halides or proton acids. Friedel-Crafts catalysts and reactions are discussed in volume 1 of *Friedel-Crafts and Related Reactions* edited by George A. Olah, 1963, Interscience Publications, pages 25–91, and in *Encyclopedia of Chemistry*, 3rd. edition, Van Nostraand Reinhold Comapny, pages 470–471. These catalysts are illustrated by metal halides, aluminum chloride, aluminum bromide, aluminum iodide, ferric chloride, zinc chloride, zirconium chloride, boron fluorides (such as boron trifluoride and complexes thereof), acids such as sulfuric acid, aromatic sulfuric acids, phosphoric acid and hydrogen fluoride. Some solid catalysts such as supported phosphoric acid, silica alumina and cation exchange resins are also included. The catalyst level ranges preferably from 4 grams to 60 grams per mole of hydroquinone. Most preferably the level is from 10 grams to 40 grams of catalyst per mole of hydroquinone. Solvents are not normally necessary since the excess olefin can act as a solvent for the reaction. When solvents are used, however, any inert organic solvent such as benzene, toluene or xylene can be used.

The order of addition of reactants and catalysts is also not critical to the antioxidant behavior of the products. The olefin, for example, can be added directly to the catalyst and the hydroquinone (and solvent, if a solvent is used) all at one time or the olefin can be added slowly over a period of time. It is normally convenient to add the olefin, catalyst and hydroquinone to the reactor and then heat them to the desired temperature.

Hydroquinone and the olefins are well known in the art. The following compounds illustrate, but do not limit the olefins which can be used in the practice of the present invention.

1-octene
2-octene
2-methyl-1-heptene
2,4-dimethyl-1-hexene
2,4,4-trimethyl-1-pentene
1-nonene
2-nonene
3-nonene
2-methyl-1-octene
2,4-dimethyl-1-heptene
2,4-dimethyl-2-heptene
2,4-dimethyl-3-heptene
2,4,4-trimethyl-1-hexene
2,5,5-trimethyl-1-hexene
4,6-dimethyl-1-heptene
2,4-dimethyl-4-heptene Any isomeric form of the octenes and nonenes can be used, e.g., primary or secondary, straightchained or branched.

Examples 1 and 2 illustrate but are not intended to limit the preparation of antioxidants of the present invention.

The mixture of nonene isomers used in Example 2 had the following composition.

| Component | Percent |
|---|---|
| Hexene | 0.21 |
| Nonene | 93.2 |
| Dodecene | 6.3 |

The nonene, 2,4-dimethyl-1-heptene, comprised 55.2 percent of the total composition.

EXAMPLE 1

Hydroquinone (220 grams), toluene sulfonic acid (24 grams), toluene (100 milliliters) and 2,4,4-trimethyl-1-pentene (537 grams) were combined in a reaction vessel equipped with a thermometer, water condenser and agitator. The combination was heated slowly to reflux (120° C.) and reacted for 6 hours. The reaction product was neutralized with 26 grams of sodium carbonate in aqueous solution. The liquid was decanted from the product and the product washed with water. Sodium carbonate (2 grams) were added and the reaction product was stripped to a pot temperature of 122° C. at 30 millimeters of mercury. The residue weighed 578 grams.

EXAMPLE 2

Hydroquinone (55 grams), toluene sulfonic acid (13 grams) and 245 grams of a mixture of nonene isomers were combined in a reaction vessel equipped with a thermometer, water condenser and agitator. The combination was heated to 100° C. and reacted for four hours. The combination was then cooled below 60° C.

and neutralized with 13 grams of sodium carbonate and 2 grams of sodium dithionite in 200 milliliters of hot water. The system was decanted and washed with water. Sodium carbonate (2 grams) were added and the reactor contents were stripped to a pot temperature of 155° C. at 19 millimeters of mercury. The residue weighed 188 grams.

| Analysis of Example 2 Product | |
|---|---|
| Unreacted hydrocarbon | 4.1% |
| Unknown monoalkyl hydroquinone | .5 |
| 2-(1,3-dimethyl-1-propylbutyl)hydroquinone | 1.0 |
| 2-(1,1,3-trimethyl hexyl)hydroquinone | 12.9 |
| 2-(1,3-dimethyl-1-propylbutyl)-5-(1,1,3-trimethyl hexyl)hydroquinone | 6.6 |
| 2,5-di(1,1,3-trimethylhexyl)hydroquinone | 40.2 |
| Unknown dialkyl hydroquinone | 34.7 |

The polymers that may be conveniently protected by the compounds described herein are oxidizable vulcanized and unvulcanized polymers susceptible to oxygen degradation, such as natural rubber, balata, gutta percha and oxidizable synthetic polymers including those containing carbon to carbon double bonds, such as rubbery diene polymers, both conjugated and nonconjugated. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene and acrylonitrile; butyl rubber, which is a polymerization product of a major proportion of a monoolefin and a minor portion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene.

The phenolic antioxidants of this invention may be used with or without other stabilizers, vulcanizing agents, accelerators or other compounding ingredients. In order to effectively stabilize polymers, small proportions of one or more of the phenolic antioxidants in accordance with this invention are added to the polymer in a customary antioxidant amount which may vary somewhat depending upon the type and requirements of the polymers to be produced. The compounds of this invention are useful in protecting polymer in any form, for example, polymer in latex form, unvulcanized polymer and vulcanized polymer.

The method of addition of the antioxidant to the polymer is not critical. It may be added by any of the conventional means such as by adding to a polymer latex, milling on an open mill or by internal mixing. When the stabilizers of this invention are employed to stabilize the cis-1,4 polyisoprene or cis-1,4 polybutadiene rubbers as described above, a convenient method of incorporation consists of adding the stabilizers to the inert organic solvent in which these polymers are normally prepared after the polymerization of the monomers is essentially complete.

Normally from about 0.001 part to about 5.0 parts of the antioxidant by weight based on the weight of the polymer can be used, although the precise amount of these effective stabilizers which is to be employed will depend somewhat on the nature of the polymer and the severity of the deteriorating conditions to which the polymer is to be exposed. In unsaturated polymers such as those made from conjugated dienes, e.g., rubbery butadiene/styrene polymers, the amount of antioxidant necessary is greater than that required by saturated polymers such as polyethylene. It has been found that an effective antioxidant amount of the disclosed stabilizer in polymers will generally range from about 0.05 part to about 5.0 parts by weight or higher based on 100 parts by weight of the polymer although it is commonly preferred to use from about 0.5 part to about 2.0 parts by weight based on 100 parts by weight of the polymer in most instances where conjugated diene polymers are being stabilized.

Both octylated and nonylated hydroquinone reaction mixtures according to the present invention have been tested in butadiene/styrene copolymers, natural rubber, butadiene/acrylonitrile copolymers, cis-1,4 polyisoprene and cis-1,4 polybutadiene. In each polymeric environment they have offered effective antioxidant protection. Some of the results are described as follows.

To a cement of polybutadiene (cis-1,4 configuration in excess of 85 percent) was added rosin acid to shortstop the polymer. Varying amounts of phenolic antioxidant were then added. Olsen Flow measurements were made on the finished polymer at 90° C.

| Sample | Antioxidant | Parts[1] | Original Flow[2] | Aging Time[3] |
|---|---|---|---|---|
| 1 | 2,6-ditert.butyl-p-cresol | 1.0 | 62 | 47 |
| 2 | 2,6-ditert.butyl-p-cresol | 0.5 | 69 | 27 |
| 3 | 2,6-ditert.butyl-p-cresol | 0.25 | 59 | 25 |
| 4 | Product of Example 2 | 1.0 | 62 | 375 |
| 5 | Product of Example 2 | 0.5 | 66 | 310 |
| 6 | Product of Example 2 | 0.25 | 70 | 165 |

[1]Parts by weight of antioxidant per 100 parts by weight of rubber.
[2]Original Olsen Flow value (viscosity units) before aging at 90° C.
[3]Hours at 90° C. for the Olsen Flow to increase 125 units above the original value.

At all levels the product of Example 2 protected the polymer for a much greater period of time than the 2,6-ditert.butyl-p-cresol.

A cement of cis-1,4 polyisoprene (in excess of 80 percent cis-1,4 configuration) was stabilized with various levels of the product of Example 2. The concentration effect was measured with and without 1.0 part of tetraethylpentamine (TEPA) added (per 100 parts by weight of rubber) by running oxygen absorption measurements at 90° C. on the compounded polymer.

| | | Hours to 1.0% Oxygen Absorption at 90° C. | |
|---|---|---|---|
| Sample | Parts of Example 2 Product | Without TEPA | With TEPA |
| 7 | 0.2 | 182 | 302 |
| 8 | 0.4 | 249 | 290 |
| 9 | 0.6 | 185 | 271 |
| 10 | 0.8 | 172 | 260 |
| 11 | 1.0 | 171 | 243 |
| 12 | 1.5 | 65 | 183 |
| 13 | 2.0 | 81 | 146 |

As shown above the nonylated hydroquinone was also effective in cis-1,4 polyisoprene.

SBR was stabilized with 1.0 part per 100 parts of SBR of the products of Examples 1 and 2 as well as 2,5-ditert-.amyl hydroquinone (a commercial stabilizer). A monooctylated hydroquinone was also used at the 1.0 part level. Oxygen absorption data obtained on the compounded rubber appears below.

| Sample | Antioxidant | Hours to 1.0% Oxygen Absorption at 100° C. |
|---|---|---|
| 14 | Example 1 | 273 |
| 15 | Example 2 | 306 |
| 16 | 2,5-ditert.amyl hydroquinone | 32 |
| 17 | Example 1 | 371 |
| 18 | 2-tert.octyl hydroquinone | 315 |

The above data indicates the effectiveness of the antioxidants of the present invention in still another polymeric environment. A comparison of Samples 17 and 18 reveal that the complex mixture of Example 1 obtained by reacting the mixture of an octene and hydroquinone was superior to the mono octylated hydroquinone of Example 18 (not included within the scope of the present invention). It has been determined that the octylation of hydroquinone with 2,4,4-trimethyl-1-pentene results in the formation of some butyl groups so that the alkylated hydroquinone mixtures include butylated, as well as octylated, compounds. Although compounds believed to be components of the mixture were tested alone and in combination, none were as effective as the complex mixture. Although some synergism was noted between the mono- and dibutylated hydroquinone, none was noted between the mono- and dioctylated hydroquinone. The former synergism was not of a level sufficient to explain the high results obtained with the octylated reaction product.

The reaction products of the present invention can be alkylated still further with other olefinic compounds. For example, products of applicant's invention have been hexylated and styrenated. Although such further alkylation did not increase the antioxidant activity of the compounds, it did increase their average molecular weight. Such a molecular weight increase would be expected to reduce their volatility and thus would enhance their persistance under heat age conditions. When the olefin (octene or nonene)/hydroquinone ratios are increased, the chances of further alkylation are naturally reduced.

The product of Example 1 was compared with 2,6-ditert.butyl-p-cresol in a high cis polybutadiene at both the 0.5 and 1.0 part level. At both levels, on oven aging, the Example 1 product was far superior. The condition of the polymer stabilized with the product of Example 1 was better after 192 hours of aging than the condition of the polymer containing the 2,6-ditert.butyl-p-cresol after 48 hours of aging.

Any of the isomeric forms of the $C_8$ and $C_9$ olefins described and listed earlier herein and any mixtures thereof can be substituted for the octene and nonenes used in Examples 1 and 2 respectively to produce antioxidant compositions which in turn could be substituted in any of the polymeric environments described herein, for the antioxidant composition actually tested, to provide effective stabilization.

All of the polymers stabilized with the antioxidant compositions of the present invention retain their prior art utilities.

While certain respesentative embodiments and details have been shown for the purpose of illustrating the invention, it will be apparent to those skilled in this art that various changes and modifications may be made therein without departing from the spirit or scope of the invention.

I claim:

1. An antioxidant composition prepared by reacting a combination comprising hydroquinone and an olefin selected from the group consisting of nonenes and 2,4,4-trimethyl-1-pentene at a temperature from 65° C. to a temperature less than the boiling point of the olefin in the presence of a Friedel-Crafts catalyst, the molar ratio of the olefin to the hydroquinone being from 1:1 to 10:1 where the olefin is nonene and 1.5:1 to 3:1 where the olefin is 2,4,4-trimethyl-1-pentene.

2. The antioxidant composition of claim 1 wherein the olefin contains 9 carbon atoms and the molar ratio of the olefin to the hydroquinone is from 1:1 to 6:1.

3. The antioxidant composition of claim 2 wherein the molar ratio of olefin to hydroquinone is from 2:1 to 5:1.

4. The antioxidant composition of claim 2 wherein the olefin is 2,4,4-trimethyl-1-pentene.

5. The antioxidant composition according to claim 3 wherein the olefin is 2,4-dimethyl-1-heptene.

* * * * *